US012611626B2

(12) United States Patent
Leitmayr et al.

(10) Patent No.: US 12,611,626 B2
(45) Date of Patent: Apr. 28, 2026

(54) METHOD AND ARRANGEMENT FOR SEPARATING CARBON DIOXIDE FROM A FEED STREAM CONTAINING CARBON DIOXIDE

(71) Applicant: Linde GmbH, Pullach (DE)

(72) Inventors: Werner Leitmayr, Pullach (DE); Thomas Ried, Pullach (DE); Gabriel Salazar Duarte, Pullach (DE); Patrick Schiffmann, Pullach (DE)

(73) Assignee: LINDE GMBH, Pullach (DE)

( * ) Notice: Subject to any disclaimer, the term of this patent is extended or adjusted under 35 U.S.C. 154(b) by 482 days.

(21) Appl. No.: 18/058,529

(22) Filed: Nov. 23, 2022

(65) Prior Publication Data

US 2023/0158442 A1 May 25, 2023

(30) Foreign Application Priority Data

Nov. 24, 2021 (EP) ..................................... 21020591

(51) Int. Cl.
| | |
|---|---|
| *B01D 53/04* | (2006.01) |
| *B01D 53/22* | (2006.01) |
| *F25J 1/00* | (2006.01) |

(52) U.S. Cl.
CPC ......... *B01D 53/0462* (2013.01); *B01D 53/22* (2013.01); *F25J 1/0027* (2013.01);
(Continued)

(58) Field of Classification Search
CPC ................ B01D 53/0462; B01D 53/22; B01D 2256/22; B01D 2257/504;
(Continued)

(56) References Cited

U.S. PATENT DOCUMENTS

| | | | | |
|---|---|---|---|---|
| 4,752,311 A | * | 6/1988 | MacLean | ............... F25J 3/0285 |
| | | | | 95/143 |
| 5,486,227 A | * | 1/1996 | Kumar | ............... B01D 53/0462 |
| | | | | 62/611 |

(Continued)

FOREIGN PATENT DOCUMENTS

| | | | | |
|---|---|---|---|---|
| CN | 105567360 A | * | 5/2016 | ................ C10L 3/08 |
| DE | 102015010164 A1 | | 2/2017 | |
| WO | 2014118262 A1 | | 8/2014 | |

OTHER PUBLICATIONS

European Search Report dated May 19, 2022 issued in corresponding application 21020591.0.

*Primary Examiner* — Stephen Hobson

(74) *Attorney, Agent, or Firm* — Millen, White, Zelano & Branigan, P.C.; Brion P. Heaney

(57) ABSTRACT

A process is proposed for separating carbon dioxide from a feed stream containing carbon dioxide, in which at least part of the feed stream is subjected to temperature swing adsorption to obtain a first and a second successive stream, wherein, in each case relative to the feed stream, the first subsequent stream is depleted in carbon dioxide and the second subsequent stream is enriched in carbon dioxide, and at least part of the second subsequent stream is subjected to membrane separation to obtain a third and a fourth subsequent stream, the third subsequent stream being depleted in carbon dioxide and the fourth subsequent stream being enriched in carbon dioxide, in each case relative to the second subsequent stream. A corresponding arrangement is also an object of the invention.

18 Claims, 1 Drawing Sheet

(52) U.S. Cl.
CPC .... *B01D 2256/22* (2013.01); *B01D 2257/504* (2013.01); *F25J 2220/64* (2013.01)

(58) Field of Classification Search
CPC ...... B01D 2259/40052; B01D 2259/65; B01D 2256/245; B01D 53/002; B01D 53/229; F25J 1/0027; F25J 2220/64; F25J 3/061; F25J 3/0635; F25J 3/067; F25J 2205/40; F25J 2205/64; F25J 2205/80; F25J 2260/20; F25J 2220/82; F25J 2230/30; F25J 2270/02; C01B 32/50; C10L 3/101; C10L 3/106; C10L 2290/06; C10L 3/104; C10L 2290/10; C10L 2290/46; C10L 2290/542; C10L 2290/543; C10L 2290/548; Y02C 20/40
See application file for complete search history.

(56) References Cited

U.S. PATENT DOCUMENTS

| | | | | |
|---|---|---|---|---|
| 7,731,779 | B2 * | 6/2010 | Palumbo | C10L 3/102 |
| | | | | 95/52 |
| 8,211,211 | B1 * | 7/2012 | Knaebel | B01D 53/75 |
| | | | | 95/122 |
| 10,155,193 | B2 * | 12/2018 | Cullinane | B01F 25/314 |
| 10,202,622 | B2 * | 2/2019 | Foody | C12P 7/10 |
| 10,300,429 | B2 * | 5/2019 | Grave | B01D 53/1462 |
| 10,315,157 | B2 * | 6/2019 | Tanaka | B01D 53/265 |
| 11,883,778 | B2 * | 1/2024 | Jariwala | C10L 3/103 |
| 12,378,491 | B1 * | 8/2025 | Bikson | B01D 53/002 |
| 2005/0098034 | A1 * | 5/2005 | Gittleman | C01B 3/56 |
| | | | | 96/121 |
| 2006/0191410 | A1 * | 8/2006 | Dolan | B01D 53/047 |
| | | | | 95/96 |
| 2011/0185896 | A1 * | 8/2011 | Sethna | C10L 3/104 |
| | | | | 95/98 |
| 2012/0111051 | A1 * | 5/2012 | Kulkarni | B01D 53/226 |
| | | | | 62/619 |
| 2013/0205828 | A1 * | 8/2013 | Sethna | F25J 3/0257 |
| | | | | 62/607 |
| 2014/0171707 | A1 * | 6/2014 | Nyce | C07C 2/04 |
| | | | | 585/329 |
| 2014/0187838 | A1 * | 7/2014 | Vaidya | C07C 7/11 |
| | | | | 585/802 |
| 2014/0224118 | A1 * | 8/2014 | Zhou | B01D 53/0462 |
| | | | | 95/1 |
| 2014/0326136 | A1 * | 11/2014 | Doong | B01D 53/0462 |
| | | | | 95/41 |
| 2014/0357925 | A1 * | 12/2014 | Mitariten | B01D 53/0462 |
| | | | | 585/802 |
| 2015/0360165 | A1 * | 12/2015 | Carson | B01D 53/047 |
| | | | | 429/410 |
| 2016/0256819 | A1 * | 9/2016 | Kulkarni | B01D 53/229 |
| 2017/0045290 | A1 * | 2/2017 | Ploeger | F25J 3/061 |
| 2018/0086985 | A1 * | 3/2018 | Von Olshausen | C10G 2/50 |
| 2018/0169561 | A1 * | 6/2018 | Jonnavittula | C01B 21/0466 |
| 2018/0264432 | A1 * | 9/2018 | Lau | B01J 20/28061 |
| 2019/0001263 | A1 * | 1/2019 | Prince | F25J 3/0209 |
| 2019/0202763 | A1 * | 7/2019 | Ishii | B01D 53/047 |
| 2019/0224612 | A1 * | 7/2019 | Russell | C10G 35/22 |
| 2019/0224617 | A1 * | 7/2019 | Mitariten | B01D 71/76 |
| 2020/0002633 | A1 * | 1/2020 | Doong | C10L 3/106 |
| 2022/0401872 | A1 * | 12/2022 | Shah | B01D 53/0407 |
| 2024/0343578 | A1 * | 10/2024 | Maurier | C01B 23/0094 |

* cited by examiner

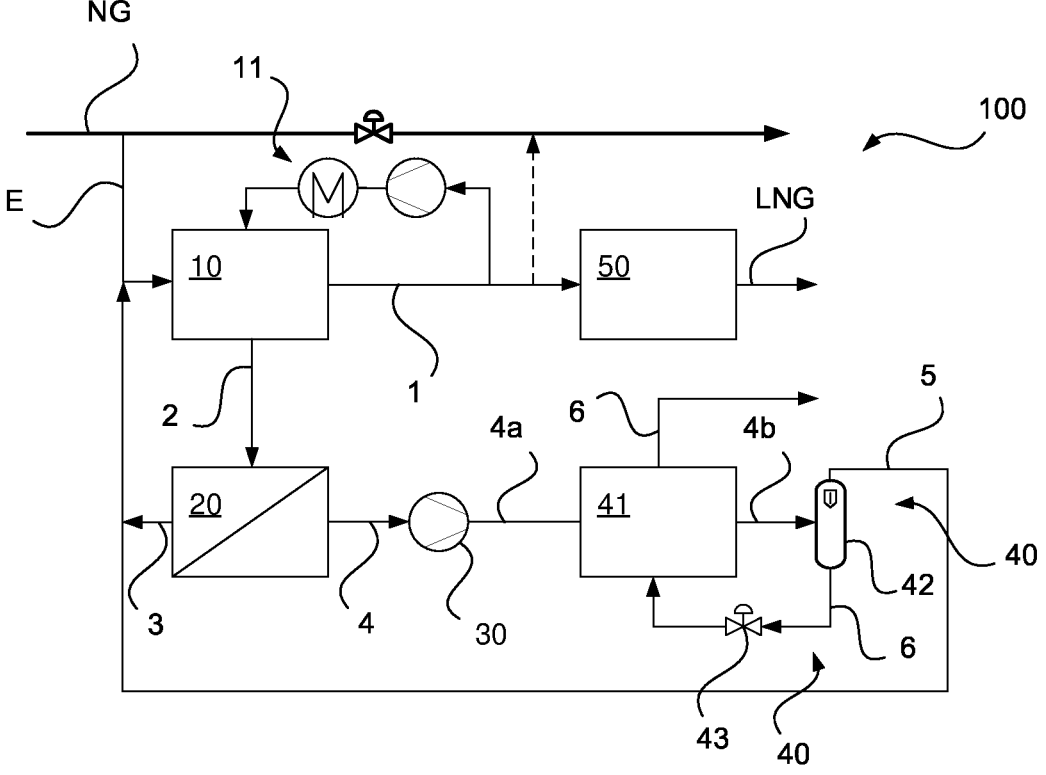

METHOD AND ARRANGEMENT FOR SEPARATING CARBON DIOXIDE FROM A FEED STREAM CONTAINING CARBON DIOXIDE

CROSS-REFERENCE TO RELATED APPLICATIONS

This application claims priority pursuant to 35 U.S.C. 119(a) to European Application No. 21020591.0, filed Nov. 24, 2021, which application is incorporated herein by reference in its entirety.

FIELD OF THE INVENTION

The invention relates to a method and an arrangement for separating carbon dioxide from a feed stream containing carbon dioxide.

BACKGROUND

The liquefaction of natural gas and the purpose thereof is described, for example, in Chapter 3 of the article "Natural Gas" in Ullmann's Encyclopedia of Industrial Chemistry, online edition 15 Jul. 2006, doi: 10.1002/14356007.a17_073.pub2. As indicated in this article, common to all natural gas liquefaction processes is that the natural gas must be pretreated prior to liquefaction to remove components that freeze out during liquefaction, are corrosive during transportation, or are environmentally harmful when combusted after regasification.

Conventionally, carbon dioxide and water in particular are removed before natural gas liquefaction. Details are described in the Ullmann article mentioned, particularly in section 2.3.3, "Dehydration" and section 2.4, "Removal of Carbon Dioxide and Sulfur Components" Amine washes, in particular, can be used for carbon dioxide removal, and the subsequent gas drying can be carried out by means of temperature swing adsorption (TSA), in particular. In an amine wash, a carbon dioxide-rich, water-saturated gas mixture is produced at low pressure. If the carbon dioxide is to be liquefied, for example for a sequestration process or for use for other purposes, this gas mixture must be compressed and dried again.

The present invention is not limited to the removal of carbon dioxide from natural gas, but is suitable in principle for all applications in which carbon dioxide is to be recovered for subsequent use, in particular in pure form, and/or separated from a gas or gas mixture to be purified, in particular prior to liquefaction.

The carbon dioxide removal processes briefly presented previously are typically costly and laborious. The present invention therefore has the object of creating corresponding improvements.

SUMMARY

This object is solved by a method and an arrangement for separating carbon dioxide from a feed stream containing carbon dioxide comprising the features of the independent claims. Embodiments are the subject of the dependent claims and the description that follows.

In the method proposed according to the invention for separating carbon dioxide from a feed stream comprising carbon dioxide, at least a portion of the feed stream is subjected to temperature swing adsorption to obtain a first and a second successive stream, wherein, in each case relative to the feed stream, and in the sense explained below, the first successive stream is depleted in carbon dioxide and the second successive stream is enriched in carbon dioxide.

Temperature swing adsorption (TSA) is an adsorptive process for the separation of gas mixtures in which the adsorbent used is regenerated using thermal energy. Temperature swing adsorption is used, for example, for exhaust gas purification or already for the treatment of gas mixtures such as natural gas or synthesis gas. Other gas mixtures can also be separated by means of temperature swing adsorption in a corresponding manner, for example gas mixtures such as biogas or waste gases from chemical or physical gas scrubbing processes such as rectisol or amine scrubbing, provided that their composition is suitable for a corresponding separation. The present invention is not limited to the use of specific adsorbents or gas mixtures.

Temperature swing adsorption makes use of the temperature dependence of adsorption processes. An adsorbent, which is housed in a suitable adsorber vessel or adsorber, is flown through in an operating cycle at a lower temperature level with the feed stream to be separated and is loaded with the component(s) to be separated from the feed stream. In a subsequent operating cycle, the adsorbent can then be largely freed from this or these components by heating, i.e. introducing thermal energy, and is in this way "regenerated". For the continuous operation of a temperature swing adsorption system, at least two adsorbers are therefore required so that one of the adsorption units is always flown through with the gas mixture stream to be separated and can thus be used to separate the gas mixture stream. This can be the case according to an embodiment of the invention but is not obligatory.

In the context of the invention, the gas mixture freed or depleted of the adsorbing components, in this case at least carbon dioxide, during the adsorption phase is the first successive stream, whereas the gas mixture containing the components desorbing again during regeneration represents the second successive stream.

Fluid streams may be, in the language as used herein, rich or poor in one or more components, where the term "rich" may represent a content of at least 80%, 90%, 95%, 99%, 99.9%, or 99.99%, or 99.999 and the term "poor" may represent a content of at most 20%, 10%, 5%, 1%, 0.01%, or 0.01% or 0.001% on a molar, weight, or volume basis. In particular, the term "predominant" may correspond herein to the term "rich".

Fluid streams may further be, in the language as used herein, be enriched or depleted in one or more components, these terms referring to a corresponding content in another fluid stream using which the fluid stream under consideration was formed. In this context, the fluid stream under consideration is "enriched" if it has at least 2 times, 5 times, 10 times, 100 times or 1000 times the content of the designated component(s), and "depleted" if it has at most 0.5 times, 0.1 times, 0.01 times or 0.001 or 0.0001 times the content of the designated component(s).

In the context of the present invention, a portion of the second successive stream is subjected to membrane separation to obtain a third and a fourth successive stream, wherein, in each case relative to the second successive stream, the third successive stream is depleted in carbon dioxide and the fourth successive stream is enriched in carbon dioxide.

Membrane separation processes for processing gas mixtures are well known and described, for example, in the article "Membranes: Gas-Separation Applications" in Ullmann's Encyclopedia of Industrial Chemistry, Wiley-VCH, online publication 2005, doi: 10.1002/14356007.a16_187.pub2. With respect to the membrane materials usable according to the invention and the gas mixtures separable by means of membrane separation processes, express reference is made to the technical literature. The present invention can in principle be used in connection with all such membrane materials and membrane separation processes.

Membrane separation processes are based on the different permeability and possibly affinity of a membrane material for different components of a gas mixture. In a membrane separation process, the gas mixture is provided on a first side of a corresponding membrane (retentate side) and a pressure gradient is generated across the membrane. Components for which the membrane has a higher permeability preferably pass through the membrane and can be removed on the second side (permeate side), possibly using a flushing gas. Components for which the membrane has a lower permeability, on the other hand, preferably remain on the retentate side and can be removed here. For a gas or gas mixture discharged on the retentate side, the term "retentate" is also used and for a gas or gas mixture discharged on the permeate side, the term "permeate" is also used.

In the context of the present invention, using the retentate of a corresponding membrane process or a portion thereof forms the third successive stream, while using the permeate or a portion thereof forms the fourth successive stream.

According to the invention, at least part of the fourth successive stream is subjected to compression and partial liquefaction to obtain a gaseous fraction and a liquid fraction, the gaseous fraction being depleted in carbon dioxide and the liquid fraction being enriched in carbon dioxide, in each case relative to the fourth successive stream.

According to the invention, at least part of the gaseous fraction is further subjected to temperature swing adsorption again together with the feed stream and at least part of the liquid fraction is subjected to flashing or expansion and used as refrigerant in a heat exchanger used in the partial liquefaction.

Particular advantages of the present invention arise from the advantageous heat integration by the expansion of the liquid fraction or a part thereof and its use as a refrigerant. Consequently, no external cooling medium is necessary.

The retentate of the membrane process, i.e. the third successive fraction, mainly contains hydrocarbons and is used as feed of the temperature swing adsorption. Due to the recirculation of this stream, the yield of hydrocarbons, which can, for example, be directed to liquefaction or to a subsequent use, is almost 100%. The losses are therefore extremely low.

The invention enables carbon dioxide capture to be achieved at significantly lower capital expenditure (CAPEX) and does not require the use of chemicals, for example compared to amine scrubbing. Overall, an uncomplicated operation results, especially with respect to changes in process conditions, e.g. fluctuating product demand. In addition to not requiring an external cooling medium for the liquefaction of carbon dioxide, there is also no need to dry a corresponding stream, as water is not introduced as in an amine wash, for example. Since the permeate pressure of the membrane process is significantly higher than the pressure of a carbon dioxide-rich fraction from an amine scrubber, a lower compressor capacity and compressor size is required.

In embodiments of the invention, a carbon dioxide content in the feed stream may be 0.1 to 2 mole percent or 0.1 to 5 mole percent and/or in the first successive stream 0.0001 to 1 mole percent or 0.001 to 0.1 mole percent and/or in the second successive stream 0.5 to 10 mole percent and/or in the third successive stream 0.5 to 5 mole percent and/or in the fourth successive stream 50 to 90 mole percent and/or in the gaseous fraction 20 to 70 or 30 to 80 mole percent and/or in the liquid fraction 90 to 99.999 mole percent.

As mentioned several times, in embodiments of the invention, the feed stream may be formed using natural gas.

In embodiments of the invention, the feed stream may be withdrawn from a natural gas pipeline and at least a portion of the first successive stream may be fed back (without liquefaction) into the natural gas pipeline.

In contrast, in alternative embodiments of the invention, at least a portion of the first successive stream may be subjected to liquefaction.

In embodiments of the invention, the heat exchanger used in the partial liquefaction is a plate heat exchanger.

In particular, the heat exchangers or heat exchanger blocks used in the present invention may be in the form of brazed aluminum plate-fin heat exchangers (PFHE; designations according to ISO 15547-2:3005), as used in a variety of process plants at different pressures and temperatures. Brazed aluminium plate-fin heat exchangers are shown in FIG. 2 of ISO 15547-2:3005 and on page 5 of ALPEMA's publication "The Standards of the Brazed Aluminium Plate-Fin Heat Exchanger Manufacturers' Association", 3rd edition 2010, where they are described in detail.

The feed stream particularly comprises methane, typically as a major compound in a content of more than 50, 60, 70, 80 or 90 mole percent. In embodiments of the invention, the feed stream may comprise one or more further components selected from water and hydrocarbons boiling higher than methane, ethane or propane, and wherein, in each case relative to the feed stream, the first successive stream is depleted in the one or more further components and the second successive stream is enriched in the one or more further components.

In embodiments of the invention, a portion of the first successive stream may be used to regenerate an adsorbent in the temperature swing adsorption and may be compressed and heated accordingly for this purpose.

In embodiments of the invention, the regeneration of the adsorbent may be carried out at a temperature of 100 to 300° C.

If no recovery of carbon dioxide is desired, the permeate or the fourth successive stream can also be used by combustion to generate the regeneration energy of the thermal swing adsorption. The plate heat exchanger is not required in such cases.

In the context of the present invention, a temperature swing adsorption may also be carried out as an indirect temperature swing adsorption (iTSA), and more particularly when a carbon dioxide content in the feed stream is greater than 2 mole percent.

In embodiments of the invention, a partial stream of the gaseous fraction can be used to generate electricity or can be burned to generate the regeneration energy of the temperature swing adsorption.

In temperature swing adsorption, in particular, several adsorbers can be used to minimize fluctuations by parallel operation or to perform heat recovery.

Carbon dioxide can also be recovered from another gas stream, e.g. associated petroleum gas. The regeneration of the temperature swing adsorption can be done with purified product or feed gas. In the latter case, no blower is required.

An arrangement for separating carbon dioxide from a feed stream containing carbon dioxide, arranged to subject at least part of the feed stream to temperature swing adsorption to obtain a first and a second successive stream, the first successive stream being depleted in carbon dioxide and the second successive stream being enriched in carbon dioxide, in each case relative to the feed stream, and subjecting at least a portion of the second successive stream to membrane separation to obtain a third and a fourth successive stream, the third successive stream being depleted in carbon dioxide and the fourth successive stream being enriched in carbon dioxide, in each case relative to the second successive stream, is also a part of the present invention.

A corresponding arrangement is characterized by means configured to subject at least a portion of the fourth successive stream to compression and partial liquefaction to obtain a gaseous fraction and a liquid fraction, wherein, in each case relative to the fourth successive stream, the gaseous fraction is depleted in carbon dioxide and the liquid fraction is enriched in carbon dioxide. These means are also configured to subject at least part of the gaseous fraction to temperature swing adsorption together with the feed stream, and to subject at least part of the liquid fraction to expansion and using it as refrigerant in a heat exchanger used in the partial liquefaction.

With regard to the arrangement provided according to the invention and its features, reference is expressly made to the above explanations concerning the method according to the invention and its embodiments, since these concern a corresponding arrangement in the same way. The same applies in particular to an embodiment of a corresponding arrangement, which is advantageously arranged for carrying out a corresponding method in any embodiment described.

BRIEF DESCRIPTION OF THE DRAWINGS

FIG. 1 illustrates a method and at the same time an arrangement according to one embodiment of the present invention.

DETAILED DESCRIPTION

The invention is further explained below with reference to the accompanying drawing, which illustrates one embodiment of the present invention.

FIG. 1 illustrates a method and at the same time an arrangement according to one embodiment of the present invention.

In the FIGURE, where applicable, structurally or functionally corresponding elements are illustrated with identical reference signs and are not explained repeatedly for the sake of clarity. If components of a device or arrangement are explained below, the corresponding explanations also relate to a process carried out with it and vice versa.

FIG. 1 illustrates a process for separating carbon dioxide from a feed stream containing carbon dioxide in accordance with an embodiment of the invention, wherein the process as a whole is designated 100 and the feed stream is designated E.

In the embodiment illustrated in FIG. 1, at least a portion of the feed stream E is subjected to temperature swing adsorption 10 in the manner described in more detail above to obtain a first and a second successive stream 1, 2, wherein, in each case relative to the feed stream E, the first successive stream 1 is depleted in carbon dioxide and the second successive stream 2 is enriched in carbon dioxide. Furthermore, in the embodiment illustrated in FIG. 1, at least part of the second successive stream 2 is subjected to membrane separation 20 in the manner described in more detail above, while obtaining a third and a fourth successive stream 3, 4, the third successive stream 3 being depleted in carbon dioxide and the fourth successive stream 4 being enriched in carbon dioxide, in each case relative to the second successive stream 2.

As further illustrated in FIG. 1 and explained in more detail above, at least part of the fourth successive stream 4 is subjected to compression 30, and the compressed fourth successive stream 4a is then subjected to partial liquefaction and phase separation in units commonly referred to with 40 to obtain a gaseous and a liquid fraction 5, 6, wherein, relative to the fourth successive stream, the gaseous fraction 5 is depleted in carbon dioxide and the liquid fraction 6 is enriched in carbon dioxide. The partial liquefaction takes place in the heat exchanger 41 forming a biphasic fourth successive stream 4b and the overall process comprises passing the fourth successive stream 4a, or a portion thereof, after compression 30, through the heat exchanger 41 and thereafter into a phase separation 42 where said phases are separated.

In addition, at least part of the gaseous fraction 5 is again subjected to temperature swing adsorption 10 together with the feed stream E and at least part of the liquid fraction 6 is subjected to expansion 43 and used as refrigerant in a heat exchanger 41 for partial liquefaction.

In the embodiment of the process 100 illustrated herein, the feed stream E is formed using natural gas by taking the feed stream E from a natural gas pipeline NG. At least a portion of the first successive stream 1 may thereby be subjected to liquefaction 50 to obtain liquefied natural gas LNG. However, as illustrated in the form of a dashed arrow, it is also possible to feed back at least part of the first successive stream 1 into the natural gas pipeline NG.

As indicated by 11 in FIG. 1 as a whole, a portion of the first successive stream 1 may be used to regenerate an adsorbent in the temperature swing adsorption 10 by compressing and heating it.

In all embodiments, at least a portion of the third successive stream 3 may also be recycled to the temperature swing adsorption 10.

What is claimed is:

1. A method for separation of carbon dioxide from a carbon dioxide-containing feed stream, comprising:

subjecting at least a part of the feed stream to a temperature swing adsorption to obtain a first successive stream and a second successive stream, the first successive stream being depleted in carbon dioxide and the second successive stream being enriched in carbon dioxide, in each case in relation to the feed stream, and subjecting at least a part of the second successive stream to a membrane separation to obtain a third successive stream and a fourth successive stream, the third successive stream being depleted in carbon dioxide and the fourth successive stream being enriched in carbon dioxide, in each case relative to the second successive stream, subjecting at least a part of the fourth successive stream to a compression and partial liquefaction in a heat exchanger to obtain a gaseous fraction and a liquid fraction, the gaseous fraction being depleted in carbon dioxide and the liquid fraction being enriched in carbon dioxide, in each case relative to the fourth successive stream, and subjecting at least a part of the gaseous fraction to the temperature swing adsorption together with the feed stream and subjecting at least part of the liquid fraction to an expansion and used as refrigerant in a heat exchanger for partial liquefaction.

2. The method according to claim 1, wherein the feed stream has a carbon dioxide content of 0.1 to 5 mole percent, and/or the first successive stream has a carbon dioxide content of 0.0001 to 1 mole percent, and/or the second successive stream has a carbon dioxide content of 0.5 to 10 mole percent, and/or the third successive stream has a carbon dioxide content of 0.5 to 5 mole percent, and/or the fourth successive stream has a carbon dioxide content of 50 to 90 mole percent, and/or the gaseous fraction has a carbon dioxide content of 20 to 70 mole percent, and/or the liquid fraction has a carbon dioxide content of 90 to 99.999 mole percent.

3. The method according to claim 1, wherein the feed stream is formed using natural gas.

4. The method according to claim 3, wherein the feed stream is withdrawn from a natural gas pipeline and at least a portion of the first successive stream is fed back into the natural gas pipeline.

5. The method according to claim 3, wherein at least a portion of the first successive stream is subjected to a liquefaction.

6. The method according to claim 1, wherein the heat exchanger used in the partial liquefaction is a plate heat exchanger.

7. The method according to claim 1, wherein the feed stream comprises methane and one or more further components selected from water and hydrocarbons boiling higher than methane, ethane or propane, and wherein, in each case relative to the feed stream, the first successive stream is depleted in the one or more further components and the second successive stream is enriched in the one or more further components.

8. The method according to claim 1, wherein a portion of the first successive stream is used to regenerate an adsorbent in the temperature swing adsorption.

9. The method according to claim 8, wherein regeneration of the adsorbent is carried out at a temperature of 100 to 300° C.

10. The method according to claim 1, wherein the feed stream has a carbon dioxide content of 0.1 to 2 mole percent, and/or the first successive stream has a carbon dioxide content of 0.001 to 0.1 mole percent, and/or the second successive stream has a carbon dioxide content of 0.5 to 10 mole percent, and/or the third successive stream has a carbon dioxide content of 0.5 to 5 mole percent, and/or the fourth successive stream has a carbon dioxide content of 50 to 90 mole percent, and/or the gaseous fraction has a carbon dioxide content of 30 to 80 mole percent, and/or the liquid fraction has a carbon dioxide content of 90 to 99.999 mole percent.

11. The method according to claim 1, wherein the feed stream has a carbon dioxide content of 0.1 to 2 mole percent.

12. The method according to claim 1, wherein the feed stream has a carbon dioxide content of 0.1 to 5 mole percent.

13. The method according to claim 1, wherein the first successive stream has a carbon dioxide content of 0.0001 to 1 mole percent.

14. The method according to claim 1, wherein the first successive stream has a carbon dioxide content of 0.001 to 0.1 mole percent.

15. The method according to claim 1, wherein the second successive stream has a carbon dioxide content of 0.5 to 10 mole percent.

16. The method according to claim 1, wherein the third successive stream has a carbon dioxide content of 0.5 to 5 mole percent.

17. The method according to claim 1, wherein the fourth successive stream has a carbon dioxide content of 50 to 90 mole percent.

18. The method according to claim 1, wherein the gaseous fraction has a carbon dioxide content of 20 to 70 mole percent.

* * * * *